(12) United States Patent
Takeda et al.

(10) Patent No.: US 6,876,900 B2
(45) Date of Patent: Apr. 5, 2005

(54) UNIT DESIGNING APPARATUS AND METHOD

(75) Inventors: Nobuhiro Takeda, Nagoya (JP); Michiyoshi Keta, Toyota (JP); Kazuhiko Okusa, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 75 days.

(21) Appl. No.: 10/315,001

(22) Filed: Dec. 10, 2002

(65) Prior Publication Data

US 2003/0139831 A1 Jul. 24, 2003

(30) Foreign Application Priority Data

Dec. 11, 2001 (JP) ........................................ 2001-377166
Nov. 21, 2002 (JP) ........................................ 2001-337619

(51) Int. Cl.[7] .......................... G06F 17/50; G06F 19/00
(52) U.S. Cl. ...................... 700/183; 700/182; 345/700; 345/764
(58) Field of Search ................................ 345/764, 810, 345/700; 700/90, 95, 117, 159, 180, 182, 183

(56) References Cited

U.S. PATENT DOCUMENTS

| | | | |
|---|---|---|---|
| 5,065,439 A | * 11/1991 | Takasaki et al. | 382/241 |
| 5,133,052 A | * 7/1992 | Bier et al. | 715/530 |
| 5,247,453 A | * 9/1993 | Mimura et al. | 700/187 |
| 5,339,247 A | * 8/1994 | Kirihara et al. | 700/106 |
| 6,177,942 B1 | * 1/2001 | Keong et al. | 345/810 |

FOREIGN PATENT DOCUMENTS

| | | |
|---|---|---|
| JP | 8-147350 | 6/1996 |
| JP | 11-25142 | 1/1999 |
| JP | 11-296566 | * 10/1999 |
| JP | 2000 099564 | 4/2000 |
| JP | 2001-338002 | * 12/2001 |

* cited by examiner

*Primary Examiner*—Jayprakash N. Gandhi
(74) *Attorney, Agent, or Firm*—Finnegan, Henderson, Farabow, Garrett & Dunner, LLP

(57) ABSTRACT

Unit design according to the present invention makes it possible for accumulated results of past design examples to be reflected in forming new designs, thereby preventing repetitive of designs and thereby reducing the time required for development. In the unit designing apparatus (1), the CPU (3) includes a basic structure designing section (21) for designing a basic structure in accordance with a given design target, and a function block searching section (23) for searching a design example of a function block for application to the engine concerned. The function block layout section (25) lays out a retrieved outer shape of a function block in a basic structural view to design a raw material shape. The CPU (3) further includes a production machining information searching section (29) for searching production machining information for application to each function block. The machining shape layout section (31) lays out a machining shape of each function block obtained from the searched production machining information in a raw material shape design drawing to design the product shape.

4 Claims, 6 Drawing Sheets

UNIT DESIGNING APPARATUS AND METHOD

FIELD OF THE INVENTION

The present invention relates to unit designing apparatus and method for designing a unit including a plurality of function blocks.

BACKGROUND OF THE INVENTION

When designing a unit including a plurality of function blocks, such as an engine of a vehicle, it is necessary to consider not only matters concerning the engine performance but also mountability and assembly of the engine onto the vehicle, factors such as performance and strength of the function blocks, and aspects related to productivity, such as the production facilities and the man-hours required for production. It is therefore important that in an automobile manufacturer designs be planned not just by an engine design team alone, but in cooperation with a production engineering team in charge of production and processing techniques for each of the function blocks. Conventionally, after determining a target for an engine design, the design team first designs the basic shape of the overall engine. Considerations related to the production engineering team are most commonly not taken into account until after the basic shape has been substantially decided and the prospective design of the overall engine design is already in view. FIG. 9 is a flowchart showing a common procedure for designing an engine, shown as a conventional example procedure for designing a unit including a plurality of function blocks.

In the basic specification setting step S1, the basic specifications are determined after the engine design target is given. For example, the design target may be defined as an engine type such as a V-6 gasoline fueled engine, a displacement such as 3.5 liters, a predetermined value of target output, and the like. The basic dimensions of the individual engine components is determined based on such design criteria.

In the basic cross-section designing step S3, the basic cross-section of the engine is designed in accordance with the basic specifications, and a drawing is created. In the basic skeleton designing step S5, a skeleton view including positions for the respective function blocks is designed and illustrated in accordance with the basic cross-sectional view. Further design is subsequently accomplished by incorporating details of each of the function blocks into this skeleton view. The steps of S3 and S5 may be executed in manners other than those described above.

The basic shape designing step S7 is for incorporating the details of the function blocks into the skeleton view. In this step, various design aspects are performed while taking into account factors such as the outer shape and positional arrangement of each function block and the relationships between the function blocks, such that the overall engine achieves the design targets. During the steps up to S7, requests concerning production technique requirements imposed by the design are conveyed from the design team to the production engineering team. However, as it is still difficult at this stage to fully present the whole aspect of the engine to those other than the members of the design team, no systematic discussions are held between the design team and the production engineering team. Accordingly, the steps up to S7 to design a new discrete engine for each design target, determine the basic shape, and bring the prospective design of the overall engine in view are executed almost entirely by the design team.

After the basic shape design has been completed so that design team can present the engine to others, the production technique consulting step S9 is performed to intensively consult on matters concerning production technique requirements in accordance with the basic shape design.

In the raw material shape designing step S11, the shapes of raw materials prior to machining are designed for the entire engine. In this stage, upon reviewing the production technique requirements requested by the basic shape design, aspects of the basic shape design that should be altered to accommodate the circumstances of production techniques are modified in the raw material shape design, where possible. Based on this raw material shape design, metal, wooden, or other molds for the engine frame and the function blocks are designed.

In the product shape designing step S13, the product shapes after machining are designed for the entire engine based on the raw material shape design. As in S11, accommodations for matters concerning the production techniques are made in the product shape design, where possible. Machining steps, processes, tools and jigs, facilities, and the like are then determined based on the product shape design.

In the fabricating step S15, the engine is fabricated using the molds formed in accordance with the raw material shape design and by performing the machining processes in accordance with the product shape design.

In the evaluating step S17, tests are performed to determine whether the fabricated engine achieves the design targets. Further, the engine is evaluated for its mountability and assembly onto a vehicle, the strength of each of the parts, and the like. When problems are found as a result of the evaluation, the problems are dealt with by returning to the proper step in the engine designing procedure.

As described above, in conventional procedure, the design team designs a new discrete engine for each design target, determines the basic shape, and brings the prospective design of the overall engine in view before consulting with the production engineering team.

In a conventional procedure as described above, although the engine design team and the production engineering team cooperate and consult each other on matters related to both engine performance and production techniques, consultations with the production engineering team conventionally take place only after the design team has already designed a new discrete engine for each design target, determined the basic shape, and brought the prospective design of the overall engine in view. For this reason, it is often difficult to include or reflect in a new design the matters concerning production techniques performed for past design examples. Furthermore, as accommodations to matters concerning the production techniques are made in later stages of the designing procedure, the accommodations can often only be included with great difficulty. Similarly, as mountability, assembly, strength, and the like are not evaluated until a later stage, it is also often difficult to incorporate design modifications determined as necessary after that evaluation. As such, the conventional design process is problematic in that significant portions of the designs must be redone, increasing the workload and prolonging the time required for development.

SUMMARY OF THE INVENTION

An object of the present invention is to reflect, in design of a new unit including a plurality of function blocks, the accumulated results of past design examples for which consultations concerning production techniques were performed, thereby eliminating repetition of designs and reducing time required for development. Further objects are to allow consultation regarding aspects concerning production techniques before determining the basic shape of the unit, to allow sufficient evaluations of mountability, assembly, strength, and the like to be conducted at an earlier stage, and to allow an engine design team and a production engineering team to simultaneously participate in design. Another object of the present invention is to accumulate the results of the new design as an additional design example, so as to further enhance the level of unit design standardization.

To accomplish the above objects, the present invention provides a unit designing apparatus for designing a unit including a plurality of function blocks, comprising a function block memory for storing a design example including an outer shape of each of the function blocks in association with a specification including a basic dimension of the unit, a search engine for searching, with respect to each of the plurality of function blocks, a design example to be applied in correlation to a specification of the unit, and a raw material shape designing device for laying out, in a basic structural view of the unit, an outer shape for each of the function blocks obtained as a result of the search to thereby design a raw material shape for the unit.

The unit designing apparatus according to the present invention further comprises a production machining information memory for storing production machining information including a machining shape applied to a design example for each of the function blocks, a production machining information search engine for searching production machining information including a machining shape for application to each of the function blocks in its raw material shape, and a product shape designing device for application to the raw material shape for the unit a machining shape for each of the function blocks obtained as a result of the search to thereby design a product shape for the unit.

The present invention further provides a unit designing method for designing a unit including a plurality of function blocks, comprising a searching step for searching, in a function block database storing a design example including an outer shape of each of the function blocks in association with a specification including a basic dimension of the unit, a design example for application to each of the plurality of function blocks in correlation to a specification of the unit. The method additionally comprises a raw material shape designing step for laying out, in a basic structural view of the unit, an outer shape for each of the function blocks obtained as a result of the search to thereby design a raw material shape for the unit.

The unit designing method according to the present invention may further comprise a production machining information searching step for searching, in a production machining information database storing production machining information including a machining shape applied to a design example for each of the function blocks, production machining information including a machining shape for application to each of the function blocks in its raw material shape. The method additionally comprises a product shape designing step for applying to the raw material shape for the unit a machining shape for each of the function blocks obtained as a result of the search to thereby design a product shape for the unit.

According to the unit designing apparatus of the present invention, a design example including an outer shape of each of the function blocks may be stored in association with a specification including a basic dimension of the unit. In this database, a design example that can be applied is searched for each of the plurality of function blocks using a specification of the unit as the key. An outer shape for each of the function blocks obtained as a result of the search is then laid out in a basic structural view of the unit to thereby design a raw material shape for the unit. In this manner, the accumulated results of past design examples for which consultations concerning production techniques were performed can be reflected in forming new designs, thereby preventing the recreation of designs and thereby reducing the time required for development. Further, as additional examples can be subsequently stored, the level of unit design standardization can be further enhanced.

Further, in the unit designing apparatus of the present invention, production machining information including a machining shape applied to each function block is stored. In such a database, production machining information including a machining shape for application to each of the function blocks in its raw material shape is searched. A machining shape for each of the function blocks obtained as a result of the search is then applied to the raw material shape for the unit to thereby design a product shape for the unit. The machining shape referred to herein may include a shape into which a material is processed by machining or the like. In this manner, the accumulated results of past design examples for which consultations concerning production techniques were performed can be reflected in forming new designs, thereby preventing repetitive designs and thereby reducing time the required for development. As the basic shape of the unit is not decided until the machining shape is applied, consultation regarding aspects of production techniques can be accomplished before the decision, allowing sufficient evaluations of mountability, assembly, strength, and the like to be conducted at an earlier stage and while allowing the design team and the production engineering team to simultaneously participate in design. Moreover, the results of a new design can be accumulated as an additional design example, thereby further enhancing the level of unit design standardization.

The present invention further provides a unit designing apparatus for designing a unit including a plurality of function blocks, comprising a function block memory for storing a design example including an outer shape of each of the function blocks in association with a specification including a basic dimension of the unit, a search engine for searching, with respect to each of the plurality of function blocks, a design example to be applied in correlation to a specification of the unit, a function block registering device for newly registering in the function block memory a function block newly designed by referring to the searched design example, and a raw material shape designing device for laying out, in a basic structural view of the unit, an outer shape for each of the function blocks obtained as a result of a search in the memory including the newly registered function block, to thereby design a raw material shape for the unit.

The unit designing apparatus according to the present invention may further comprise a production machining information memory for storing production machining information including a machining shape applied to a design example for each of the function blocks, a production machining information search engine for searching production machining information including a machining shape for application to each of the function blocks in its raw material shape, a production machining information registering device for registering, in the production machining information memory, production machining information created by referring to the searched production machining information for application to the newly designed function block, and a product shape designing device for applying to the raw material shape for the unit a machining shape for each of the function blocks obtained as a result of a search in the memory including production machining information for application to the newly designed function block, to thereby design a product shape for the unit.

The present invention further provides a unit designing method for designing a unit including a plurality of function blocks, comprising a searching step for searching, in a function block database storing a design example including an outer shape of each of the function blocks in association with a specification including a basic dimension of the unit, a design example for application to each of the plurality of function blocks in correlation to a specification of the unit. The method additionally comprises a function block registering step for newly registering in the function block database a function block newly designed by referring to the searched design example, and a raw material shape designing step for laying out, in a basic structural view of the unit, an outer shape for each of the function blocks obtained as a result of a search in the database including the newly registered function block, to thereby design a raw material shape for the unit.

The unit designing method according to the present invention may further comprise a production machining information searching step for searching, in a production machining information database storing production machining information including a machining shape applied to a design example for each of the function blocks, production machining information including a machining shape for application to each of the function blocks in its raw material shape. The method additionally comprises a production machining information registering step for registering, in the production machining information database, production machining information created by referring to the searched production machining information for application to the newly designed function block, and a product shape designing step for applying to the raw material shape for the unit a machining shape for each of the function blocks obtained as a result of a search in the database including the production machining information for application to the newly designed function block, to thereby design a product shape for the unit.

When developing a unit, it is necessary to continually incorporate new technologies to create products that effectively compete in the market. According to the configuration described above, a new function block incorporating such new technologies can be designed by referring to or consulting design examples already stored in the function block database, and the designed function block can be newly registered in the function block database. Similarly, new production machining information for application to the newly designed function block can be created by referring to or consulting the production machining data already stored in the production machining information database, and the created machining information can be newly registered in the production machining information database. In this manner, designing of a unit raw material shape incorporating new technologies can be accomplished, and creation of a unit product shape incorporating new technologies can also be achieved.

DETAILED DESCRIPTION OF THE INVENTION

Figure 1:
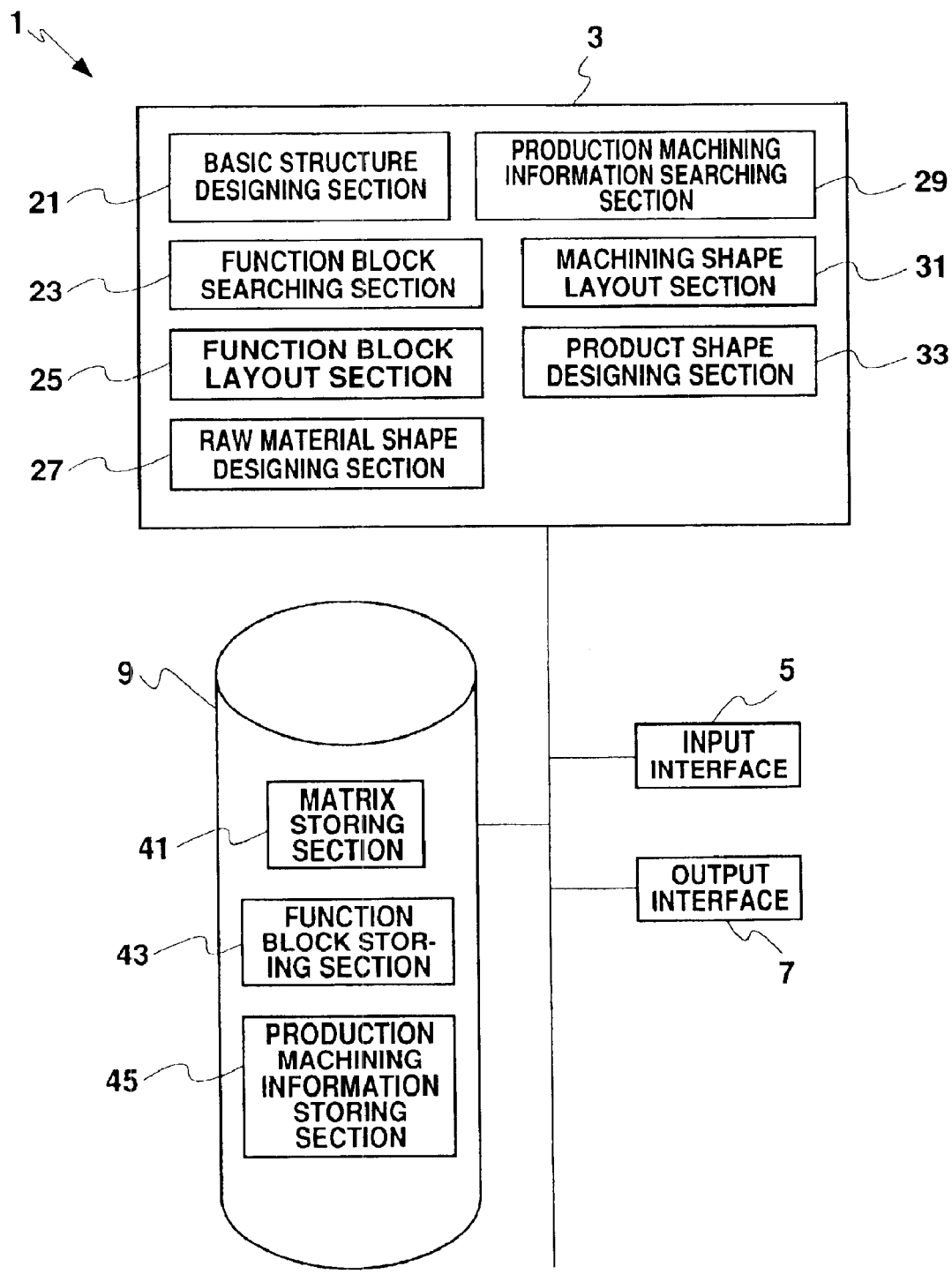
FIG. 1 is a block diagram showing a unit designing apparatus according to an embodiment of the present invention.

An embodiment of the present invention will next be described in detail while referring to the drawings. Although a vehicle engine will be described as an example of a unit including a plurality of function blocks, the present invention may be appropriately applied to other units. FIG. 1 is a block diagram showing the unit designing apparatus 1 which is a typical computer. The unit designing apparatus 1 comprises a CPU 3, an input interface 5, an output interface 7, and an external memory device 9, all of which are connected via a bus. The unit designing apparatus 1 may connect to an externally provided database through a network connection via the input interface 5 and the output interface 7.

The CPU 3 includes a basic structure designing section 21 for designing a basic structure in accordance with a given design target, and a function block searching section 23 for searching a design example of a function block for application to the engine concerned. The function block layout section 25 lays out a searched outer shape of a function block in a basic structural view. The raw material shape designing section 27 designs a raw material shape. The CPU 3 further includes a production machining information searching section 29 for searching production machining information for application to each function block. The machining shape layout section 31 lays out a machining shape of each function block obtained from the searched production machining information in a raw material shape design drawing. A product shape is designed in the product shape designing section 33.

The external memory device 9 includes a matrix storing section 41 for storing various correlations between engines and the function blocks in a matrix, a function block storing section 43 for storing design examples for the respective function blocks, and production machining information storing section 45 for storing production machining information for application to the function blocks.

Figure 2:
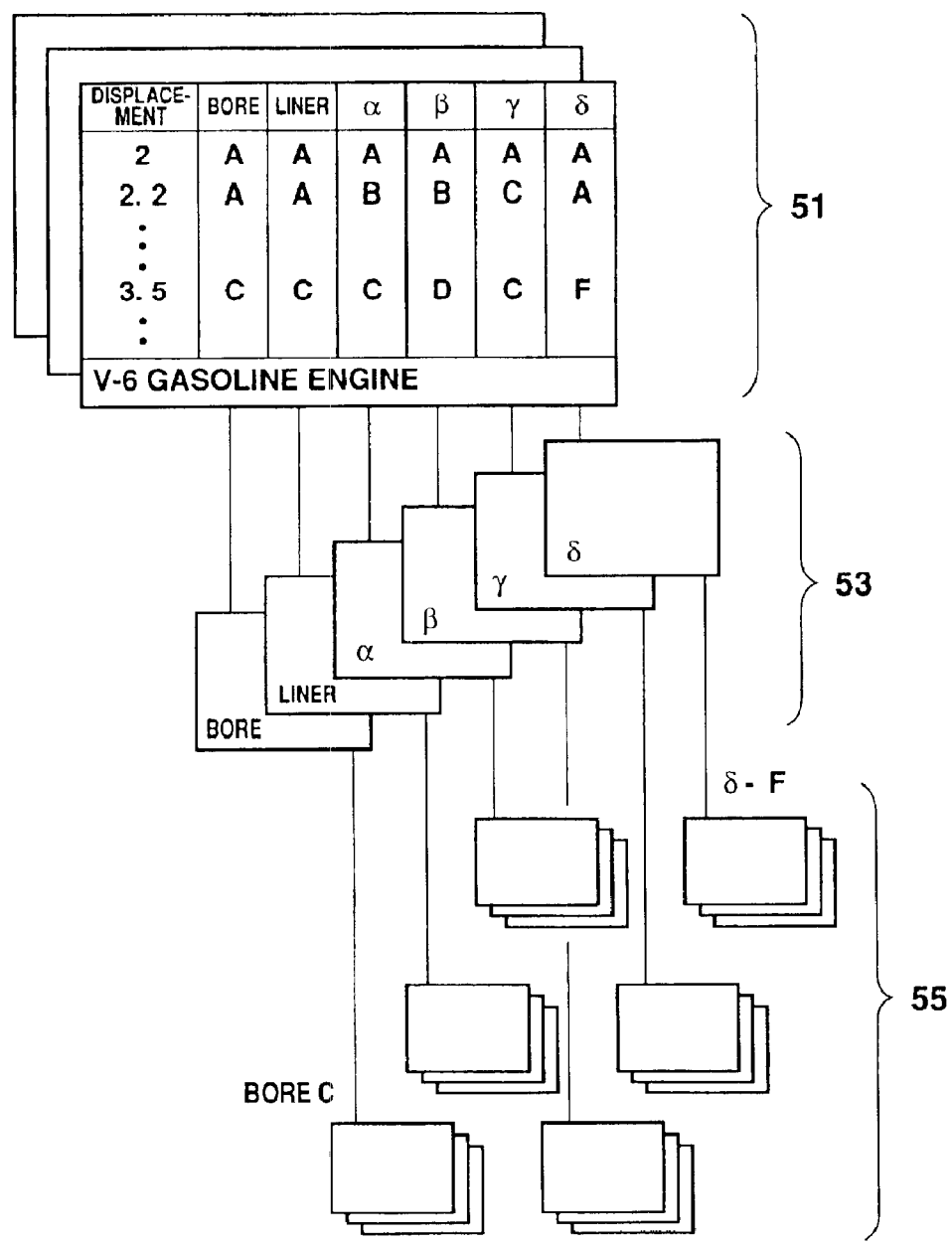
FIG. 2 is a diagram for explaining the data structure for matrix data, function block data, and production machining information data according to the embodiment of the present invention.

FIG. 2 is a diagram for explaining a data structure for matrix data 51, function block data 53, and production machining information data 55, which are stored in the matrix storing section 41, the function block storing section 43, and the production machining information storing section 45, respectively. When creating a new engine design, an engine type such as V-6 gasoline engine, a basic dimension of the engine such as a displacement of 3.5 liters, a target output, and the like are given to define the criteria of the design target. The data are therefore stored in a data structure which allows data necessary for engine design to be searched based on engine types, basic dimensions represented by displacement, and the like.

The matrix data 51 is organized in a data structure in which data are grouped according to engine type. Data for each engine type includes basic dimension data represented by displacement and function block design example data. For example, when "V-6 gasoline engine" is input as the selected engine type, past design examples accumulated for that engine type can be searched in a matrix comprising displacement data and data for each of the function blocks. When the displacement of 3.5 liters is selected in this matrix, the design examples for the respective function blocks that may be used in an engine having that particular displacement can be searched. In the example of FIG. 2, the data search provides the information that a V-6 gasoline engine having the displacement of 3.5 liters can be constituted by employing a combination including bore type C as the bore, liner type C as the liner, and other function blocks α-C, β-D, γ-C, and δ-F.

The function block data 53 is organized in a data structure in which data are grouped by each function block, and the data grouped according to function block are in turn grouped by design example. Data for each design example includes design data including the outer shape of the function block for that design example. For example, when "bore" is input as the selected function block, a list of accumulated past design examples for bore is indicated. When selecting the design example of bore C, data including the outer shape, detailed drawing, dimension specification, and the like concerning bore C can be searched.

The production machining information data 55 is organized in a data structure in which data are grouped according to design example of each function block. Data for each design example includes production machining data such as the machining or other machining shape, standard processing procedure, standard processing conditions, standard tools, standard jigs, and standard facilities. For example, when "bore C" is input as the selected function block design example, production machining data with respect to bore C can be retrieved.

The manner in which the above-described data structure functions will next be described while referring to the flowcharts of FIG. 3 and FIGS. 4–8 showing the respective states of the engine in its designing stages.

Figure 3:
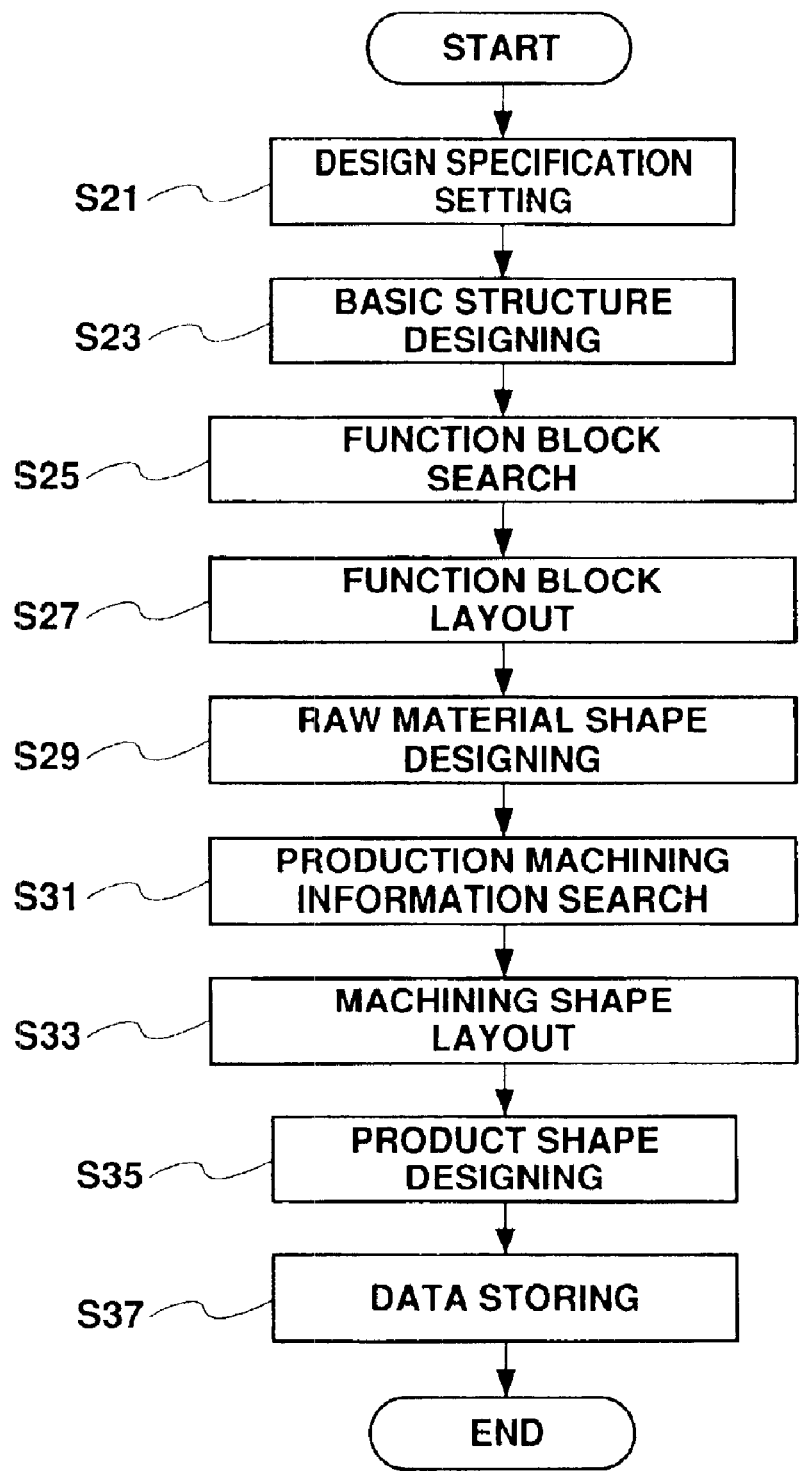
FIG. 3 is a flowchart illustrating the embodiment of the present invention.

In the design specification setting step S21 of FIG. 3, from the design target, the specification including the basic dimensions of the engine, such as displacement, are set. For example, the displacement may be specified as a 3.5 liter V-6 gasoline engine.

Figure 4:
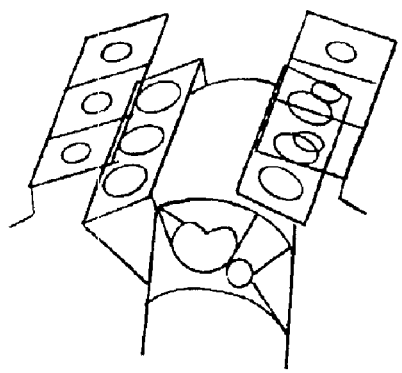
FIG. 4 is a basic structural view of an engine designed according to the embodiment of the present invention.

In the basic structure designing step S23, the basic structure designing section of the CPU 3 creates, based on the new engine design concept, the basic skeleton view and basic structural view showing the arrangement relationship among the function blocks. FIG. 4 shows an example of such a basic structural view of a V-6 gasoline engine.

Figure 5:
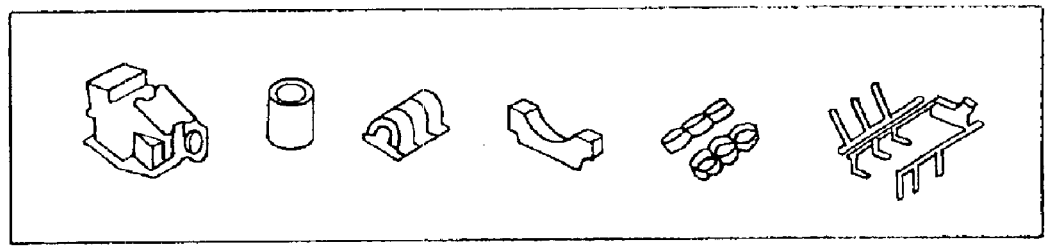
FIG. 5 is a schematic view showing items such as bore C and liner C searched according to the embodiment of the present invention.

In the function block searching step S25, the function block searching section 23 searches a design example including an outer shape for application to each function block in correlation with the engine specification. The search can be conducted using a specification of the engine as the key. By inputting "V-6 gasoline engine", a matrix associated with that engine type can be read out. Subsequently, using the displacement of 3.5 liters, a combination of design examples of the respective function blocks that constitute the engine to be designed can be read out. According to the data in FIG. 2, a combination including bore C, liner C, α-C, β-D, γ-C, and δ-F is obtained. Next, information including the outer shape is read out concerning each of bore C, liner C, and so on. FIG. 5 shows schematic views of the thus searched items including bore C and liner C, and the like.

In the function block layout step S27, the function block layout section 25 lays out, in the basic structural view obtained in S23, the outer shapes of the respective function blocks searched in S25.

Figure 6:
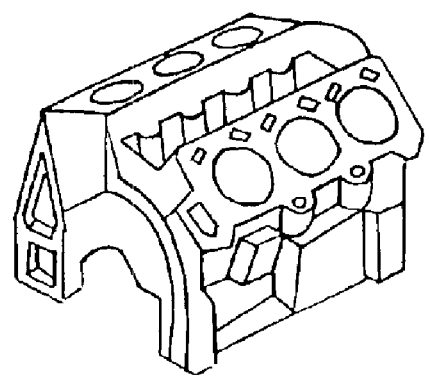
FIG. 6 is a schematic view showing a raw material shape designed according to the embodiment of the present invention.

In the raw material shape designing step S29, the raw material shape designing section 27 designs the engine raw material shape prior to machining, based on the basic structural view including the laid-out outer shapes of the respective function blocks obtained in S27. When the obtained data are insufficient, such as in a case where S25 did not provide data for all of the function blocks constituting the new engine, required components are designed in the present step. Further, components which cannot be incorporated into the data may be designed by simultaneous participation of the design team and the production engineering team. FIG. 6 shows a schematic view of the engine raw material shape designed based on the basic structural view incorporating the laid-out outer shapes of the respective function blocks.

When developing a unit, it is necessary to continually incorporate new technologies to create products that effectively compete in the market. A new function block incorporating new technologies can be designed by referring to or consulting, the design examples already stored in the function block storing section 43.

More specifically, a new function block is designed according to the following procedure, and the newly designed function block is subsequently registered in the function block storing section 43.

A specification of the engine to be designed is first determined, and then a function block for incorporating a new technology is identified. Using the specification of the engine as the search key, a design example for application to the identified block is searched in the function block storing section 43. The procedure up to this point is identical to the basic structure designing step S23 and the function block searching step S25 described above. For example, when incorporation of a new technology is intended for a bore of an engine having a displacement of 3.5 liters, after the outer shape, detailed diagram, dimension specification, and the like for bore C are searched as in the above example, a determination is made as to whether the searched features of bore C fulfill the conditions for incorporating the new technology concerned.

When it is determined that the searched features of bore C fulfill the conditions for incorporating the new technology, the new technology is incorporated into bore C. The design procedure is then continued by executing the function block layout step S27 and other subsequent steps.

When it is determined that the searched features of bore C do not fulfill the conditions for incorporating the new technology, the features of other registered bores such as bore A and bore B are searched and referred to in addition to those of bore C. The searched design examples are then consulted to design a new bore N. During the design process of the new bore N, the outer shape, detailed diagram, dimension specification, and the like for the new bore N are defined by referring to the design examples and sufficiently studying whether the new shape can be manufactured using the existing production techniques and facilities. Simultaneous participation of the design team and the production engineering team is preferred during design of a new function block.

As a result of referencing the design examples registered in the function block storing section 43, a new design may be formed simply by editing the existing designs, or, alternatively, it may be determined that creation of a new outer shape differing from the existing designs is required.

The new function block designed by incorporating a new technology while referring to existing design examples as described above is then registered in the function block storing section 43 in association with its engine specification. Subsequently, the designing procedure is continued by executing the function block searching step S25 and other subsequent steps, thereby enabling design of a unit raw material shape using the function block incorporating a new technology.

Figure 7:
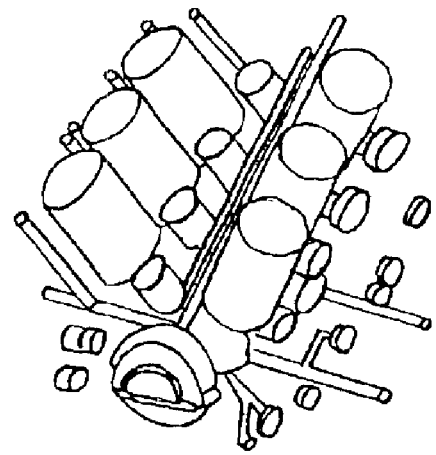
FIG. 7 is a schematic view synthesizing the searched machining shapes for the respective function blocks according to the embodiment of the present invention.

In the production machining information searching step S31, the production machining information searching section 29 searches, in the production machining information storing section 45, production machining information including machining shapes with respect to each of the design examples of the respective function blocks. For example, inputting "bore C" triggers execution of a search for production machining data including the machining shape, standard processing procedure, standard processing conditions, standard tools, standard jigs, and standard facilities for bore C. FIG. 7 is a schematic view synthesizing the searched machining shapes for the respective function blocks.

In the machining shape layout step S33, the machining shape layout section 31 lays out the machining shapes acquired through the above search in the raw material shape drawing obtained in S29. The machining or other processing shapes of the respective function blocks may be separately laid out, or, alternatively, laid out in the synthesized state shown in FIG. 7.

Figure 8:
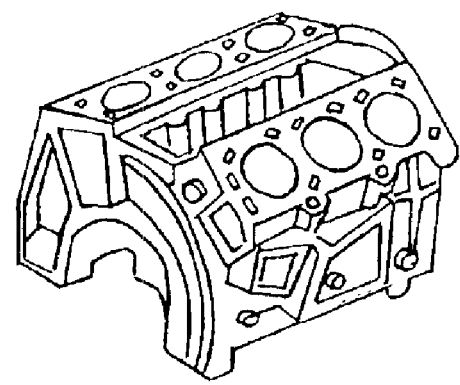
FIG. 8 is a schematic view showing a product shape designed according to the embodiment of the present invention.
Figure 9:
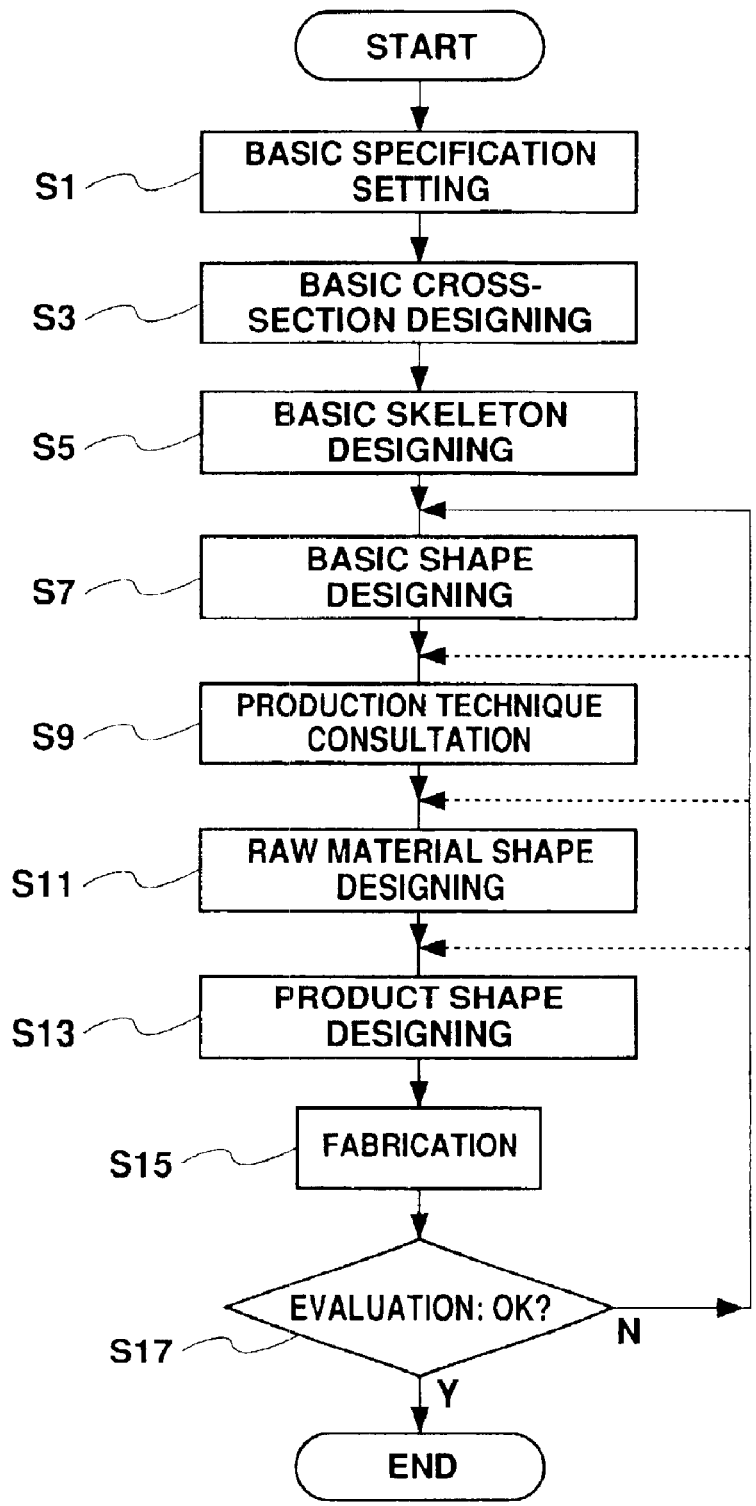
FIG. 9 is a flowchart showing a conventional procedure for designing an engine.

In the product shape designing step S35, the product shape designing section 33 designs the engine product shape after machining based on the raw material shape drawing incorporating the laid-out machining shapes of the function blocks formed in S33. When the acquired data are insufficient, such as in a case where S31 did not provide data for all of the function blocks constituting the new engine, missing sections are designed in the present step. Further, sections which cannot be incorporated into the data may be designed by simultaneous participation of the design team and the production engineering team. FIG. 8 shows a schematic view of the engine product shape designed based on the raw material shape drawing incorporating the laid-out machining shapes of the function blocks.

As described in relation to the raw material shape designing step S29, new function blocks are designed to continually incorporate new technologies, and the data such as the outer shapes of such newly designed function blocks are registered in the function block storing section 43. In the above example, bore N is newly registered in the function block storing section 43. When a new production machining should be performed for a new function block, new production machining information including an outer shape is created in the product shape designing step S35.

More specifically, production machining information associated with the new function block is created by searching and referring to or consulting the existing production machining information stored in the production machining information storing section 45. It is apparent that this step of creating production machining information may immediately follow the step of designing the new function block. According to the above example, production machining data including the machining shape, processing steps, tools, jigs, facilities, and the like for bore N are created. Simultaneous participation of the design team and the production engineering team is preferred during creation of the production machining information for the new function block.

The created data are registered in the production machining information storing section 45 in association with the new function block. When, as a result of referencing the existing production machining information, it is determined that existing production machining information is sufficient for the new function block, that existing production machining information is correlated to the new function block. Subsequently, the designing procedure is continued by executing the production machining information searching step S31 and other subsequent steps, thereby allowing designing of a unit product shape using a function block incorporating a new technology.

The data storing step S37 is executed whenever a new engine design is completed to store the data for the new engine design in the matrix storing section 41, the function block storing section 43, and the production machining information storing section 45.

In this manner, the matrix storing section 41, the function block storing section 43, and the production machining information storing section 45 accumulate additional data each time a new design is created. By considering these data when designing new units, the accumulated results of past design examples for which consultations concerning production techniques were performed can be reflected in the new design, thereby preventing repetitive design and thereby reducing time the required for development.

Further, according to the present invention, consultation regarding aspects of production techniques can be accomplished before the basic shape of the unit is decided, at points such as before the raw material shape and the product shape are designed. This makes it possible to conduct sufficient evaluations of mountability, assembly, strength, and the like at an earlier stage. Furthermore, the design team and the production engineering team can simultaneously participate in design.

Moreover, the results of the new design can be accumulated as an additional design example, thereby further enhancing the level of unit design standardization.

What is claimed is:

1. A unit designing apparatus for designing a unit including a plurality of function blocks, comprising:
    a function block memory for storing a design example, which is a result of a past design for which consultations concerning production techniques were performed, including an outer shape of each of the function blocks in association with a specification including a basic dimension of the unit;
    a search engine for searching, with respect to each of the plurality of function blocks, a design example to be applied in correlation with a specification of the unit;
    a raw material shape designing device for laying out, in a basic structural view of the unit, an outer shape for each of the function blocks obtained as a result of the search to thereby design a raw material shape for the unit;
    a production machining information memory for storing production machining information, resulting from the past design for which consultations concerning production techniques were performed, including a machining shape applied to a design example for each of the function blocks;

a production machining information search engine for searching the production machining information including a machining shape for application to each of the function blocks in its raw material shape; and a product shape designing device for applying to the raw material shape for the unit a machining shape for each of the function blocks obtained as a result of the search to thereby design a product shape for the unit.

2. A unit designing method for designing a unit including a plurality of function blocks, comprising:

searching in a function block database storing a design example, which is a result of a past design for which consultations concerning production techniques were performed, including an outer shape of each of the function blocks in association with a specification including a basic dimension of the unit, a design example for application to each of the plurality of function blocks in correlation with a specification of the unit;

laying out, in a basic structural view of the unit, an outer shape for each of the function blocks obtained as a result of the search to thereby design a raw material shape for the unit;

searching in a production machining information database storing production machining information, which is a result of the past design for which consultations concerning production techniques were performed, including a machining shape applied to a design example for each of the function blocks, the production machining information including a machining shape for application to each of the function blocks in its raw material shape; and applying to the raw material shape for the unit a machining shape for each of the function blocks obtained as a result of the search to thereby design a product shape for the unit.

3. A unit designing apparatus for designing a unit including a plurality of function blocks, comprising:

a function block memory for storing a design example, which is a result of a past design for which consultations concerning production techniques were performed, including an outer shape of each of the function blocks in association with a specification including a basic dimension of the unit;

a search engine for searching, with respect to each of the plurality of function blocks, a design example to be applied in correlation with a specification of the unit;

a function block registering device for newly registering in the function block memory a function block newly designed by referring to the searched design example;

a raw material shape designing device for laying out, in a basic structural view of the unit, an outer shape for each of the function blocks obtained as a result of a search in the memory including the newly registered function block, to thereby design a raw material shape for the unit;

a production machining information memory for storing production machining information, which is a result of the past design for which consultations concerning production techniques were performed, including a machining shape applied to a design example for each of the function blocks;

a production machining information search engine for searching the production machining information including a machining shape for application to each of the function blocks in its raw material shape;

a production machining information registering device for registering, in the production machining information memory, the production machining information created by referring to the searched production machining information for application to the newly designed function block; and a product shape designing device for applying to the raw material shape for the unit a machining shape for each of the function blocks obtained as a result of a search in the memory including the production machining information for application to the newly designed function block, to thereby design a product shape for the unit.

4. A unit designing method for designing a unit including a plurality of function blocks, comprising:

searching in a function block database storing a design example, which is a result of a past design for which consultations concerning production techniques were performed, including an outer shape of each of the function blocks in association with a specification including a basic dimension of the unit, a design example for application to each of the plurality of function blocks in correlation with a specification of the unit;

newly registering in the function block database a function block newly designed by referring to the searched design example;

laying out, in a basic structural view of the unit, an outer shape for each of the function blocks obtained as a result of a search in the database including the newly registered function block, to thereby design a raw material shape for the unit;

searching in a production machining information database storing production machining information, which is a result of the past design for which consultations concerning production techniques were performed, including a machining shape applied to a design example for each of the function blocks, the production machining information including a machining shape for application to each of the function blocks in its raw material shape;

registering, in the production machining information database, the production machining information created by referring to the searched production machining information for application to the newly designed function block; and applying to the raw material shape for the unit a machining shape for each of the function blocks obtained as a result of a search in the database, including the production machining information for application to the newly designed function block, to thereby design a product shape for the unit.

* * * * *

UNITED STATES PATENT AND TRADEMARK OFFICE
CERTIFICATE OF CORRECTION

PATENT NO. : 6,876,900 B2
DATED : April 5, 2005
INVENTOR(S) : Nobuhiro Takeda

It is certified that error appears in the above-identified patent and that said Letters Patent is hereby corrected as shown below:

<u>Title page,</u>
Item [30], Foreign Application Priority Data, "2001-337619" should read -- 2002-337619 --.

Signed and Sealed this

Sixteenth Day of August, 2005

JON W. DUDAS
*Director of the United States Patent and Trademark Office*